US005206280A

United States Patent [19]

Williams

[11] Patent Number: 5,206,280

[45] Date of Patent: Apr. 27, 1993

[54] LASER MARKABLE WHITE PIGMENT COMPOSITION

[75] Inventor: Stewart W. Williams, Bristol, United Kingdom

[73] Assignee: British Aerospace Public Limited Company, London, England

[21] Appl. No.: 666,898

[22] Filed: Mar. 8, 1991

[30] Foreign Application Priority Data

Mar. 15, 1990 [GB] United Kingdom ................ 9005872

[51] Int. Cl.[5] ................................ C08K 3/22

[52] U.S. Cl. ......................... 524/409; 524/411; 524/412; 524/413; 524/433; 524/436; 524/437

[58] Field of Search .............. 524/409, 411, 412, 413, 524/433, 436, 437

[56] References Cited

U.S. PATENT DOCUMENTS

| | | | |
|---|---|---|---|
| 3,509,082 | 4/1970 | Mays | 260/22 |
| 3,741,929 | 6/1973 | Burton | 260/40 |
| 4,111,892 | 9/1978 | Kamada et al. | 260/40 |
| 4,218,362 | 8/1980 | Honjo et al. | 524/409 |
| 4,654,290 | 3/1987 | Spanjer | 430/138 |
| 4,957,961 | 9/1990 | Chandrasckaren et al. | 524/413 |

FOREIGN PATENT DOCUMENTS

| | | |
|---|---|---|
| 0036680 | 9/1981 | European Pat. Off. . |
| 0190997 | 1/1986 | European Pat. Off. . |
| 0329884 | 6/1988 | European Pat. Off. . |
| 0321091 | 6/1989 | European Pat. Off. . |
| 9008805 | 8/1990 | European Pat. Off. . |
| 2648270 | 12/1990 | Fed. Rep. of Germany . |
| 786016 | 11/1957 | United Kingdom . |
| 1108202 | 4/1968 | United Kingdom . |
| 1222823 | 2/1971 | United Kingdom . |
| 1237164 | 6/1971 | United Kingdom . |
| 1296488 | 11/1972 | United Kingdom . |
| 1312083 | 4/1973 | United Kingdom . |
| 1586327 | 3/1981 | United Kingdom . |
| 2151237 | 7/1985 | United Kingdom . |

*Primary Examiner*—Paul R. Michl
*Assistant Examiner*—Edward J. Cain
*Attorney, Agent, or Firm*—Cushman, Darby & Cushman

[57] ABSTRACT

A laser markable white pigment composition includes a first pigment which is markable by ultraviolet laser, a second pigment, which is nonabsorbing in the ultraviolet region of the optical spectrum and which has a white appearance in the visible region of the optical spectrum, with the ratio of the amount of first pigment to amount of second pigment being in the range of from 4:1 to 1:10, so that the second pigment is present in an amount sufficient to increase the optical density, that is the whitening effect, of the composition, without adversely affecting the laser markability of the composition, and a carrier which is at least one fluoropolymer transparent in the ultraviolet region of the optical spectrum.

8 Claims, 1 Drawing Sheet

LASER MARKABLE WHITE PIGMENT COMPOSITION

FIELD OF THE INVENTION

This invention relates to a laser markable white pigment composition particularly, but not exclusively, suitable for use as a laser markable coating on an insulation covered wire.

BACKGROUND OF THE INVENTION

One of the problems encountered with laser markable white pigment compositions used as coating on an insulating cover of a wire is that of making the coating sufficiently thin to avoid undesirable increase weight per unit length of the wire whilst at the same time being sufficiently optically dense to obscure any darker coloration present in the underlaying layer of the wire. The optical density of the coating maybe increased by increase of thickness but this not only undesirably increases the weight per unit length of the wire but can result in increased production difficulties, micro-cracking and increased expense due to the requirement for more applications of the coating to build up the required thickness.

Another technique is to increase the optical density of the coating to obscure the materials underneath and produce a white finish, by increasing the concentration of the white pigment titanium dioxide in the coating composition. Unfortunately the greater the concentration of titanium dioxide in the coating composition the poorer is the contrast of the mark produced in the coating by laser beam irradiation. Thus in general terms with such coatings increase of the titanium dioxide concentration in the coating increases the optical density and hence the whiteness of the coating but at the expense of reduced contrast and hence legibility in any marking produced in or on the coating by laser beam irradiation. A decrease of titanium dioxide concentration in the coating composition improves the laser marking effect, contrast and legibility but undesirably reduces the optical density and hence whiteness of the coating which can conventionally only be overcome by an undesirable increase in thickness of the coating.

OBJECTS OF THE INVENTION

Thus one object of the present invention is to provide a generally improved laser markable white pigment composition which is readily markable by laser beam irradiation with high contrast and legibility.

Another object of the present invention is to provide a laser markable white pigment composition which has a sufficiently high optical density so that a relatively thin coating exhibits sufficient whiteness to obscure any underlaying material coloration.

These and other objects and advantages of the present invention will become more apparent from details disclosed in the following specification where preferred embodiments of the invention are discribed.

SUMMARY OF THE INVENTION

According to a first aspect of the present invention there is provided a laser markable white pigment composition, which composition includes a first pigment which is markable by ultraviolet laser, a second pigment, which is nonabsorbing in the ultraviolet region of the optical spectrum and which has a white appearance in the visible region of the optical spectrum, with the ratio of the amount of first pigment to amount of second pigment being in the range of from 4:1 to 1:10, so that the second pigment is present in an amount sufficient to increase the optical density, that is the whitening effect, of the composition, without adversely affecting the laser markability of the composition, and a carrier which is at least one fluoropolymer transparent in the ultraviolet region of the optical spectrum.

By "ultraviolet region of the optical spectrum" as used in this specifications is meant light radiation having a wavelength in the range of from approximately 193 to approximately 400 nanometers and by "visible region of the optical spectrum" as used in this specification is meant light radiation having a wavelength in the range of from about 400 to 720 nanometers.

Preferably the first pigment is at least one selected from the group comprising titanium dioxide, antimony trioxide, polyethylethylketone (PEEK) and polyethylsulphone (PES).

Conveniently the second pigment is at least one selected from the group comprising silicon dioxide, magnesium oxide, aluminium oxide and diamond.

Advantageously the fluoropolymer is at least one selected from the group comprising polytetrafluoroethylene, fluoroethylenepropylene and ethylenetetrafluoroethylene.

Conveniently the composition comprises from 1 to 35% by dry weight titanium dioxide, from 2 to 30% by dry weight second pigment and the balance, apart from impurities and incidental constituents, being fluoropolymer.

Advantageously the composition includes 4% by dry weight titanium dioxide and from 4 to 20% by dry weight second pigment.

DESCRIPTION OF THE DRAWINGS

For a better understanding of the present invention, and to show how the same maybe carried into effect, reference will now be made, by way of example, to the accompanying drawings, in which.

DESCRIPTION OF EMBODIMENTS OF THE INVENTION

Figure 1:
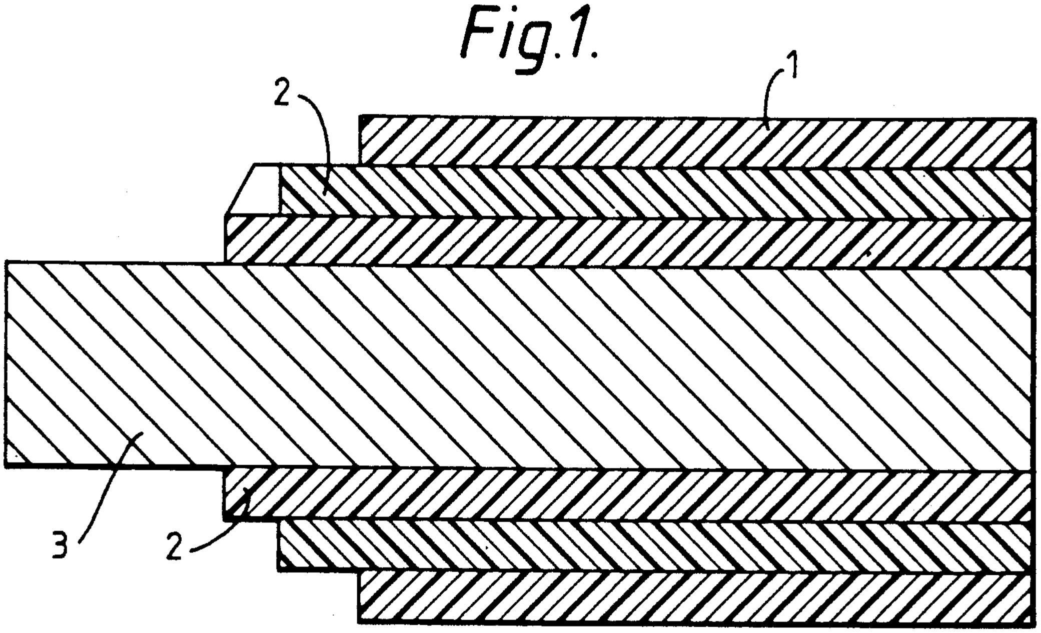
FIG. 1 is a diagrammatic longitudinal cross sectional view through part of a wire having a laser markable white pigment composition coating suitable for marking by ultraviolet laser.

A laser markable white pigment composition for addition to or coating on a material according to the present invention, may be contained in or coated on a material in the form of a paint, plastic, pharmaceutical, ink, paper, cement or ceramic.

The laser markable white pigment composition particularly suitable for such use includes a first pigment which is markable by ultraviolet laser, such as one or more of titanium dioxide, antimony trioxide, polyethylethylketone (PEEK) and polyethylsulphone (PES), and a second pigment which is nonabsorbing in the ultraviolet region of the optical spectrum (having a wavelength in the range of from approximately 193 to approximately 400 nanometers) and which has a white appearance in the visible region of the optical spectrum (having a wavelength in the range of from 400 to 720 nanometers). In this composition the ratio of the amount of first pigment to amount of second pigment is in the range of from 4:1 to 1:10, preferably by dry weight, so that the second pigment is present in an amount sufficient to increase the optical density, that is the whitening effect, of the composition, without adversely affecting the laser markability of the composition. A suitable second pigment is one or more of silicon dioxide, magnesium oxide, aluminium oxide and diamond.

Preferably the laser markable white pigment composition of the invention is utilised as a coating on a wire and in general terms the following description will be with reference to such coating on a wire, for convenience.

To this end the composition includes a carrier which is transparent in the ultraviolet region of the optical spectrum, in the form of at least one fluoropolymer. Preferably the fluoropolymer is one or more of polytetrafluoroethylene (P.T.F.E.), fluoroethylenepropylene (F.E.P) and ethylenetetrafluoroethylene (ETFE). A preferred composition comprises from 1 to 35% by dry weight titanium dioxide, from 2 to 30% by dry weight second pigment and the balance, apart from impurities and incidental constituents, being fluoropolymer.

Polymer dispersion coatings are usually added to the outside of the insulation of a wire to give the wire a white or coloured appearance and to allow it to carry identification markings. Conventional dispersion coatings usually contain a fluoropolymer and one or more pigments. A longitudinal cross section through such a wire is shown in FIG. 1, in which the laser markable dispersion coating or white pigment composition coating 1 is applied as the outer coating on one or more, preferably two, layers of insulating polyimide (Kapton-Trade Mark) layers 2, which in turn overlie a metallic core or conductor 3. The outermost of the layers 2 maybe made of PTFE, FEP or ETFE in the form of tape or extrusions.

The coating 1 should be kept as thin as possible (typically 15 to 20 micrometers) to keep the weight per unit length of the wire down and to prevent micro-cracking of the coating. To ensure that the coating is completely opaque and so produces a white finish, the coating normally contains a high proportion (typically in the range of from 20 to 40% by dry weight) of dry titanium dioxide pigment. However, if this wire is marked by a single pulse of irradiation from an ultraviolet (UV) laser such as an Excimer laser, the contrast produced is unacceptably low, having a contrast value of less than 40%. To produce a mark by ultraviolet laser with a sufficiently high contrast, the pigment loading, it has been found, must be reduced to about 4% but in general terms less than 10% titanium dioxide can lead to an undesirable loss of optical density and hence of the whitening effect in the coating.

According to the invention the second pigment in the composition is one or more of silicon dioxide, magnesium oxide, aluminium oxide or diamond. This second pigment appears white in the visible part of the spectrum but is nonabsorbing in the ultraviolet. This means that it will increase the optical density of the coating 1 but does not affect the ultraviolet printing or marking process. Hence the coating 1 can remain thin (less than 20 micrometers in thickness) so keeping the weight per unit length of the wire down whilst permitting successful marking by ultraviolet lasers with a high contrast. Preferably the composition contains from 1 to 35% by dry weight titanium dioxide, from 2 to 30% by dry weight of the second pigment and the balance, apart from impurities and incidental constituents, being fluoropolymer.

The most preferred composition includes 4% by dry weight titanium dioxide and from 4 to 20% by dry weight of the second pigment. In general terms the lower the concentration by dry weight of titanium dioxide the higher the contrast in the marking produced by the ultraviolet laser in the coating. Actual concentrations of the second pigment will vary depending on the density of the pigment, the covering power of the pigment and the thickness of the coating 1 required. When the first pigment is antimony trioxide, polyethylethylketone (PEEK) and/or polyethylsulphone (PES) the preferred amount in the composition is 3% by dry weight.

Figure 2:
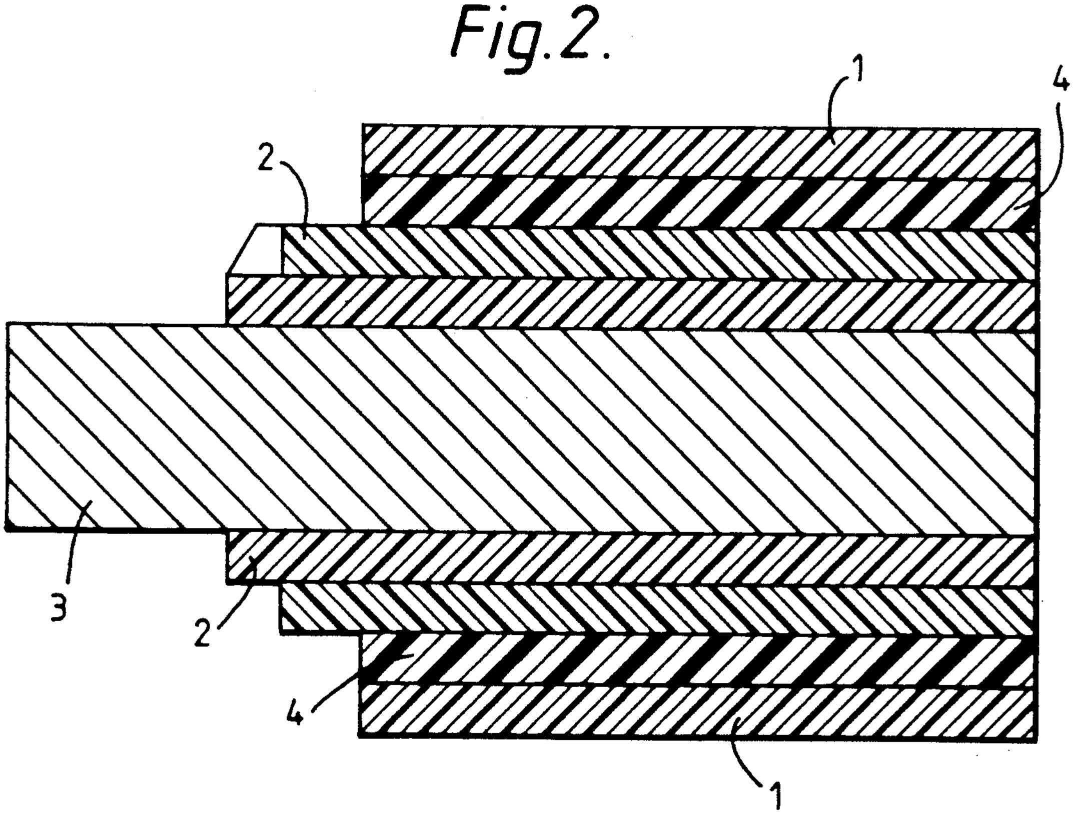
FIG. 2 is a view similar to that of FIG. 1 of a wire carrying a laser markable white pigment composition according to the present invention suitable for marking by a $CO_2$ laser.

A laser markable white pigment composition according to the present invention can also be used as a coating markable by infra-red (IR) lasers which are principally $CO_3$ and Nd/YAG lasers. A longitudinal cross section of a wire constructed for this marking technique is shown in FIG. 2. As shown in FIG. 2 the laser markable white pigment composition of the invention is in the form of a coating 1 which in this case is applied to a layer 4 of a dark material. In this technique irradiation by the IR laser radiation beam produces a marking by physically removing the coating 1 immediately underneath the laser beam to expose the darker layer 4. The thickness of the coating 1 should not be more than 20 micrometers to ensure that it is always completely removed by the laser and this again means that in conventional terms the coating 1 must contain a high concentration of pigment loading to ensure a white finish to the wire and adequate concealment of the darker underlaying layer 4. This would mean that high contrast marking could not be produced in such a wire construction by ultraviolet laser techniques. On the contrary using a coating 1 of a composition according to the present invention enables the use of an ultraviolet laser with a wire of FIG. 2 to produce a satisfactory high contrast marking on the coating 1 which can be kept to less than 20 micrometers in thickness without losing optical density to an extent that the underlaying darker layer 4 would show through. In the example of FIG. 2 features already shown in FIG. 1 have been given like references and are not further described. Of course a composition according to the invention means that the wire construction of FIG. 2 can be marked by both ultraviolet and infra-red lasers.

Another form of wire construction, not illustrated, which is suitable for marking by infra-red laser is basically similar to that of FIG. 1, except in this alternative the outer-most layer 2 is a dark coloured PTFE tape with a coating 1 of less than 20 micrometers thickness applied there-to. When irradiated with an infra-red laser a mark is produced by removing the coating 1 where irradiated to show the underlaying layer of dark coloured PTFE tape. Such a wire can now be marked by an ultraviolet laser by making the coating 1 of a composition according to the present invention which is sufficiently optically dense and has sufficient whiteness to prevent the underlaying darker colored layer 2 showing through even if less than 20 micrometers in thickness. Additionally such a coating 1 is markable by an ultraviolet laser beam with satisfactory contrast.

A laser markable white pigment composition according to the present invention maybe in the form of a dry mix or a dispersion in water. The particle size of the second pigment can be optimised to produce the right balance between covering power and the effect of the pigment on the ultraviolet laser.

Various modifications and alterations may be made to the embodiments of the present invention described and illustrated, within the scope of the present invention as defined in the following claims.

What is claimed is:

1. A laser markable white pigment composition, which composition consists essentially of a first pigment which is markable by ultraviolet laser, a second pigment, which is nonabsorbing in the ultraviolet region of the optical spectrum and which has a white appearance in the visible region of the optical spectrum, with the ratio of the amount of first pigment to amount of second pigment being in the range of from 4:1 to 1:10, so that the second pigment is present in an amount sufficient to increase the optical density, that is the whitening effect, of the composition, without adversely affecting the laser markability of the composition, and a balance of the composition being a carrier which is at least one fluoropolymer transparent in the ultraviolet region of the optical spectrum.

2. A composition according to claim 1, in which the first pigment is at least one selected from the group comprising titanium dioxide, antimony trioxide, polyethylethylketone (PEEK) and polyethlysulphone (PES).

3. A composition according to claim 1, in which the second pigment is at least one selected from the group comprising silicon dioxide, magnesium oxide, aluminium oxide and diamond.

4. A composition according to claim 1, in which the fluoropolymer is at least one selected from the group comprising polytetrafluoroethylene, fluoroethylenepropylene and ethylenetetrafluoroethylene.

5. A composition according to claim 1, comprising from 1 to 35% by dry weight titanium dioxide, from 2 to 30% by dry weight second pigment and the balance, apart from impurities and incidental constituents, being fluoropolymer.

6. A composition according to claim 5, including 4% by dry weight titanium dioxide and from 4 to 20% by dry weight second pigment.

7. A composition according to claim 1, in the form of a dry mix.

8. A composition according to claim 1, in the form of a dispersion in water.

* * * * *